United States Patent [19]

Eaton

[11] Patent Number: 5,603,347

[45] Date of Patent: Feb. 18, 1997

[54] SILLCOCK RUPTURE CONTROL ASSEMBLY

[76] Inventor: Rodger D. Eaton, 1436 S. Washington, Wichita, Kans. 67211

[21] Appl. No.: 464,573

[22] Filed: Jun. 5, 1995

[51] Int. Cl.$^6$ .................................................. F16L 5/00
[52] U.S. Cl. ........................... 137/360; 137/375; 137/801
[58] Field of Search ..................................... 137/360, 801, 137/375, 359

[56] References Cited

U.S. PATENT DOCUMENTS

| | | | |
|---|---|---|---|
| 2,952,270 | 9/1960 | Fulton et al. | 137/360 |
| 3,331,386 | 7/1967 | Politz . | |
| 4,158,366 | 6/1979 | Van Meter | 137/312 |
| 4,178,956 | 12/1979 | Fillman | 137/360 |
| 4,314,580 | 2/1982 | Steinwand | 137/360 |
| 4,473,244 | 9/1984 | Hill | 285/14 |
| 4,538,637 | 9/1985 | Williams | 137/360 |
| 4,836,237 | 6/1989 | McCullough | 137/312 |
| 4,909,270 | 3/1990 | Enterante, Sr. et al. | 137/107 |
| 5,156,105 | 10/1992 | Conway | 137/296 |

*Primary Examiner*—A. Michael Chambers
*Attorney, Agent, or Firm*—Hovey, Williams, Timmons & Collins

[57] ABSTRACT

An improved leak guard for preventing damage to a building caused by a ruptured conventional sillcock, wherein the sillcock has a tube, a valve within the tube and a control knob at one end of the tube operably coupled with the valve. The leak guard includes a tubular connector interconnecting the tube of the sillcock and the supply line for establishing fluid communication therebetween and a housing sealingly secured to the connector. The housing has an internal chamber for receiving the tube of the sillcock when the sillcock is connected to the connector. Further, the housing has an outlet disposed to be located outside the building when the guard is installed for directing leaking water from the sillcock to a point outside the building.

27 Claims, 1 Drawing Sheet

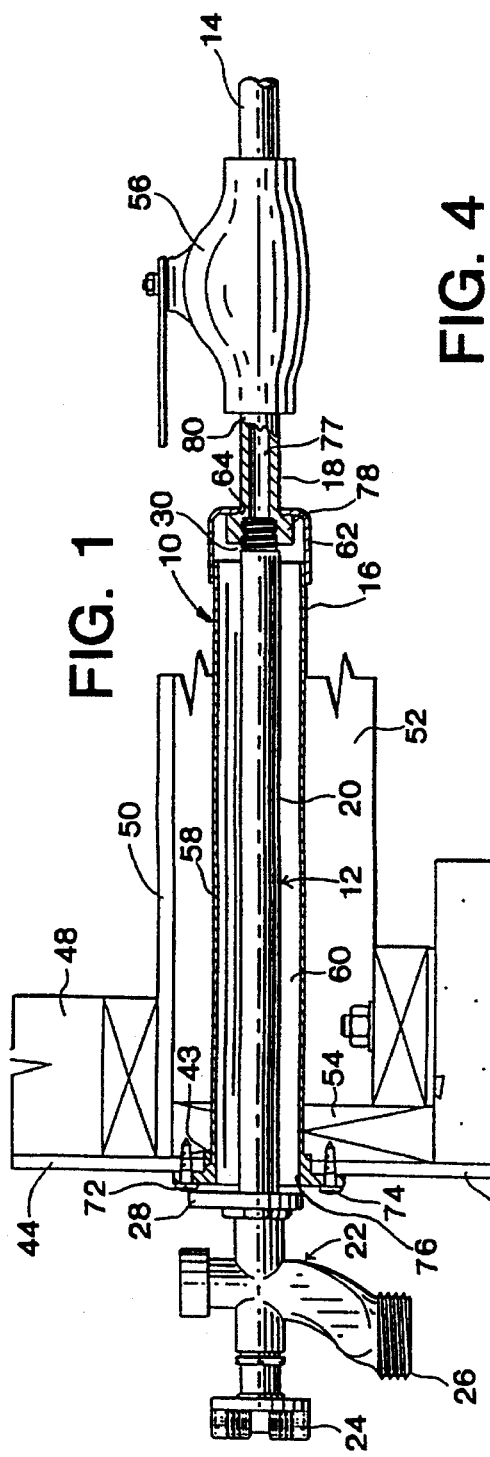
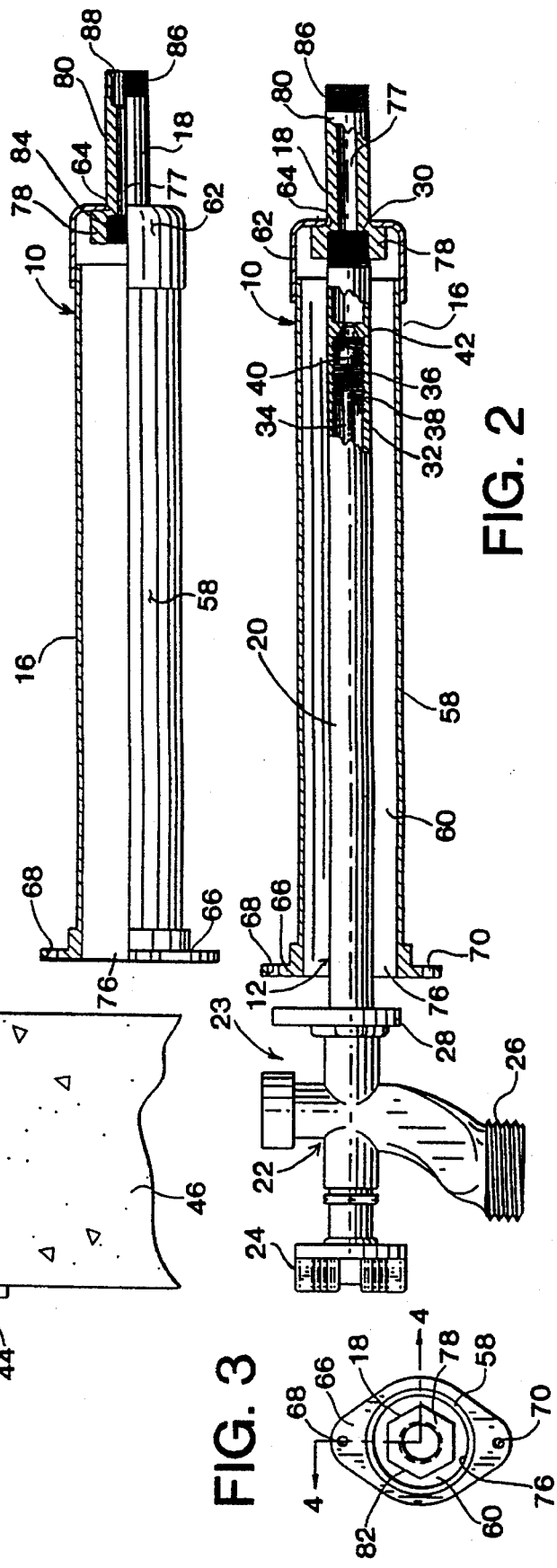

SILLCOCK RUPTURE CONTROL ASSEMBLY

BACKGROUND OF THE INVENTION

1. Field of the Invention

The present invention relates generally to plumbing fixtures and supplies and, more particularly, to a protective leak guard for preventing damage to a building caused by a ruptured sillcock, wherein the guard is particularly designed for assembly with conventional sillcocks and designed to facilitate removal and installation of the sillcock from outside the building.

2. Discussion of Prior Art

Most homes and buildings are provided with water spigots that supply water exteriorly of the structure. An exterior water spigot, commonly referred to as a "sillcock" typically extends through an outside building wall to a crawl space or basement of the building wherein it connects to a water supply line of the building or home. Conventionally, a sillcock includes a handle, a valve operated by the handle, a spigot, a hose connection, and an elongated pipe extending through the building wall and interconnecting the spigot and the building water supply.

In geographic regions where temperatures fall below freezing, a sillcock having its valve disposed outside the building, i.e. adjacent the spigot, has a tendency to rupture or break as water retained by the valve expands in response to freezing conditions. Consequently, "freeze proof" sillcocks evolved in which the valve is disposed adjacent the innermost end of the sillcock and is connected to the handle by a valve rod. In this fashion, the valve is designed to seat within the interior portion of the building where temperatures remain above freezing. Accordingly, when the valve is turned to an off position (the valve is seated), water within the pipe and spigot is allowed to drain and supply water is retained by the valve in above-freezing conditions. If properly operated, the sillcock prevents water from being exposed to freezing temperatures, and thus, prohibits sillcock breakage due to water freezing therein. Almost all newly constructed homes and buildings are provided with freeze proof sillcocks.

However, freeze proof sillcocks still have a tendency to rupture. This often occurs by the building or home owner leaving a hose connected to the sillcock, which prevents the pipe and spigot from draining. In this condition, water is trapped within the sillcock irrespective of whether or not the valve is in the off position. During subfreezing conditions, the trapped water expands due to freezing, and this expansion causes cracks in the sweat joints or breakage of the pipe. Clearly, subsequent thawing or use of the sillcock will cause water to flow through the cracks and into the interior portion of the home or building, which may result in substantial water damage to the home or building. Moreover, since breakage of the sillcock is not readily apparent to the user, a building or home owner must utilize the sillcock (i.e., unseat the valve) and risk the possibility of water damage in order to check the condition of the sillcock.

In response to this problem, apparatuses have been developed, which replace or adapt freeze proof sillcocks, to direct water leaking from the ruptured sillcock outside the building or home. Protective apparatuses that are used with conventional sillcocks typically include an elongated tubular member for receiving the sill cock and an O-ring, elastomeric washer or some type of seal ring that is disposed between the tubular member and sillcock adjacent the innermost end thereof to prevent water from draining into the building or house. Further, at the opposed outermost end, the tubular member is either open or provided with another seal ring and a small drain tube or relief stem to direct water draining from a ruptured sillcock to a point outside the home or building.

Clearly, these protective devices may be used to retrofit a house furnished with conventional sillcocks. However, installation of such devices and replacement of sillcocks with such devices have proven to be difficult and time consuming. For example, conventional protective devices often require access to the supply line located interiorly of the home so that a tightening band may be placed on the outer wall of the protective device for encircling the seal ring, which may require entrance into a crawl space. Further, it is common practice to cover plumbing, such as supply lines, with finished walls or ceilings, which requires the wall or ceiling to be cut or damaged to provide access to the supply line. Such devices also require the building owner to coordinate a time so that the plumber may be allowed into the building to replace the ruptured sillcock. Moreover, in a geographic region having a seasonal climate, O-rings, elastomeric washers and other types of seal rings eventually degrade in some manner, such as by corrosion or cracking, which destroys the sealed connection between the sill cock and protective apparatus.

Alternatively, protective apparatuses have been developed that wholly replace the conventional sillcock. Typically, replacement apparatuses include a spigot, a valve mechanism, an inner flow pipe, and a protective housing or drain conduit, all as a single structure. Such a design may provide superior and longer lasting protection than conventional sillcock protective devices. The replacement apparatuses may also provide for installation and replacement of the inner flow pipe from outside the building. However, such apparatuses are typically complex in design, which inherently increases cost and, most likely, installation or replacement time of the assembled apparatus. Moreover, since replacement apparatuses are not adaptable with conventional sillcocks, these devices are impractical as sillcocks continue to be widely used by plumbing artisans.

Thus, it would be desirable to provide a protective device of simple design, which may be utilized with a conventional sillcock, that provides an improved connection between the sillcock and housing while permitting removal and installation of the sillcock from outside the home.

OBJECTS AND SUMMARY OF THE INVENTION

Accordingly, an important object of the present invention is to provide a leak guard of simple design that may be utilized with a conventional sillcock for preventing damage to a building when the sillcock ruptures. Further, the present invention provides a leak guard having an improved connection between the sillcock and leak guard, which is not as susceptible to corrosion and seasonal climates as conventional protective housings.

Another object of the present invention is to provide a leak guard that affords easy removal and installation of the conventional sillcock from outside the home (i.e., allows a ruptured sillcock to be replaced without having to enter the building).

In accordance with these and other objects evident from the following description of a preferred embodiment of the invention, the leak guard may be assembled with a conventional sillcock, wherein the sillcock has a tube, a valve within the tube and a control knob at one end of the tube operably coupled with the valve. The leak guard includes a tubular connector interconnecting the tube of the sillcock and the supply line for establishing fluid communication therebetween and a housing sealingly secured to the connector. The housing has an internal chamber for receiving the tube of the sillcock when the sillcock is connected to the connector. Further, the housing has an outlet disposed to be located outside the building when the guard is installed for directing leaking water from the sillcock to a point outside the building.

BRIEF DESCRIPTION OF THE DRAWING FIGURES

A preferred embodiment of the invention is described in detail below with reference to the attached drawing figures, wherein:

FIG. 1 is a fragmentary, side elevational view of a leak guard constructed in accordance with the preferred embodiment, illustrating the guard attached to the outside wall of a building and fluidly coupled with a conventional sillcock and a water supply line of the building;

FIG. 2 is an enlarged, fragmentary, side elevational view of the leak guard depicted in FIG. 1, illustrating the guard assembled with a conventional sillcock, a portion of the sillcock pipe being broken away to show the valve mechanism;

FIG. 3 is an end view of the leak guard depicted in FIG. 2; and

FIG. 4 is an enlarged, fragmentary view similar to FIG. 2, but illustrating the leak guard without the sillcock and a portion of the leak guard being broken away along line 4—4 of FIG. 3.

DETAILED DESCRIPTION OF THE PREFERRED EMBODIMENT

Turning now to the drawings, and particularly FIG. 1, a leak guard, generally denoted by the numeral 10, in accordance with the present invention is illustrated interconnecting a conventional sillcock, generally designated 12, and a water supply line 14. Broadly speaking, the preferred leak guard 10 includes a housing 16 and an axially aligned tubular connector 18.

As shown in FIGS. 1–2, the conventional sillcock 12 includes an elongated tube 20 interconnected with a spigot assembly, generally designated 22, at the tube's outermost end by conventional means, such as sweat soldering, brazing, welding, or gluing. The spigot assembly 22 includes a control knob 24 for controlling flow of water through the sillcock 12, a downwardly open hose connection 26, and an escutcheon plate 28 for enhancing the appearance of the sillcock 12. Conventionally, a male-threaded nipple 30 is provided at the innermost end of the tube 18 for connection to the water supply line 14. The tube 18 includes an internal valve mechanism, broadly denoted by numeral 32, disposed adjacent the innermost end of the tube 18. The illustrated sillcock 12 is considered a "freeze proof" sillcock, as previously discussed.

The valve mechanism 32 includes a valve rod 34 that extends along the length of the tube 20 and is operably coupled with the control knob 24. The innermost end of the valve rod 34 is provided with a male threaded ring 36 that threadably interengages a female threaded recess 38 within the tube 20. Further, a valve head 40 is disposed at the end of the rod 34 to seat against an associated valve seat 42 formed within the tube 20. Although not illustrated, it will be appreciated that the ring 36 has a number of openings extending therethrough to permit passage of water through the ring 36 when the valve head 40 is unseated.

Although the industry standard is to install ten inch sillcocks in most homes, sillcocks are available in two inch increments for lengths varying from six to thirty inches. It will be appreciated that the present invention may be utilized with any length sillcock and may also be provided in two inch increments to correspond with available sillcocks.

Accordingly, water flow through the sillcock 12 is controlled by the control knob 24. When water flow is desired, the control knob 24 is rotated in a counterclockwise direction, which causes valve rod 34 to rotate counterclockwise and move in a leftward direction (as shown in FIG. 2). Consequently, the valve head 40 shifts away from the valve seat 42 and water flows through the ring 36, the tube 20 and out connection 26. Conversely, when it is desired to stop the flow of water, the control knob 24 is rotated in a clockwise direction to seat the valve head 40 against the valve seat 42. Once the valve head 40 is seated, water remaining within the tube 20 is permitted to drain therefrom through connection 26. However, if water is prevented from draining from the tube 20 (e.g., if a hose is left attached to the connection 26), the sillcock 12 is susceptible to breakage caused by freezing conditions.

As shown in FIG. 1, the sillcock 12 and leak guard 10 may be assembled and installed within an opening 43 of the outside wall 44 of a building (see FIG. 1). Details of construction of the home or building are not set forth herein in view of the fact that those skilled in the art are well acquainted with constructional details of homes and buildings. Suffice it to point out that a traditional building includes a cement foundation 46, interior wall stud 48, floor 50, wooden floor joist 52, and an upstanding wooden header 54 extending from the underside of the floor 50 to the foundation 46. As illustrated, the water supply line 14 runs immediately underneath the floor 50 and parallel to the floor joist 52. Further, the supply line 14 is provided with a conventional shut-off valve 56 so that the sillcock 12 may be replaced without having to shut-off the building's main water supply line.

As described, the preferred leak guard includes a housing 16 and an axially aligned tubular connector 18 (see FIGS. 3–4). Preferably, the housing 16 is formed of copper and comprises an elongated, cylindrical sleeve 58 defining an internal chamber 60 for receiving the tube 20 of the sillcock 12. Further, a copper cap 62 is connected by conventional means, such as sweat soldering or brazing, to the innermost end of the sleeve 58. The cap 62 includes a central aperture 64 for receiving the connector 18. The cap 62 is similarly connected to the connector 18 by conventional means. It will be appreciated that the means for connecting the cap 62 to the sleeve 58 and connector 18 is not prone to failure caused by corrosion or varying climatic conditions. Accordingly, the cap 62 is sealingly connected between the sleeve 58 and connector 18.

As best shown in FIG. 3, an elliptically shaped flange 66 extends radially from the outermost end of the sleeve 58. Preferably, at the focal ends of the flange 66, a pair of screw holes 68, 70 are drilled to receive associated screws 72, 74 for securing the guard 10 to the outside wall 44 of the building (FIG. 1). Further, the sleeve 58 is open at its outermost end to define an outlet 76 so that water in the internal chamber 60 may drain outside the building.

Although the outlet 76 will be restricted when the sillcock 12 is assembled with the leak guard 10 (due to the tube 20 and escutcheon plate 28), it will be appreciated that the spigot assembly 22 is disposed sufficiently away from the outlet 76 and the sleeve 58 is of a sufficient diameter that water is permitted to flow freely through the outlet 76.

Preferably, the connector 18 is in the form of an elongated brass shank that defines a fluid passageway 77 intercommunicating the sillcock 12 and supply line 14 (see FIG. 1). Further, the preferred shank connector 18 includes a coupling 78 disposed in the chamber 60 and a nipple 80 projecting outwardly from the housing 16. As illustrated in FIGS. 3-4, the coupling 78 commonly has a hexagonal outer periphery 82 and an internal threaded wall 84 for attachment to the male-threaded nipple 30 of the sillcock 12. It will be observed that the nipple 80 has a male-threaded portion 86 for threadably interengaging the female threads (not shown) of the supply valve 56. If desired, the threaded portion 86 may extend along the entire length of the nipple 80. Alternatively, the nipple 80 is provided with an internal socket 88 at the innermost end thereof for a sweat solder or brazed connection directly to the supply line 14. It will be appreciated that because the connector 18 is formed of brass and because the coupling 78 and nipple 80 are thicker than traditional copper tubing, the connector 18 is less susceptible to torsional twisting which may occur when a sillcock is removed or installed.

It will be appreciated that the housing 16 and connector 18 may be formed of a variety of alternative materials, such as polyvinyl-chloride ("PVC") or galvanized steel. Further, although the sleeve 58, cap 62 and connector 18 have been described as separate components of the leak guard 10 sealingly interconnected by conventional means, it will be appreciated that the present invention may alternatively be embodied as an integral structure. For example, the sleeve 58, cap 62 and connector 18 may be formed as a unitary PVC body by conventional methods, such as roto-molding.

When the leak guard 10 and sillcock 12 are assembled to the outside wall 44 of the building, the sillcock 12 may be used in the usual manner to control flow of water from the supply line 14. As previously described, a hose left attached to the connection 26 prevents water from draining from the tube 20, and upon exposure to freezing conditions, causes the tube 20 to rupture. Clearly, subsequent thawing and use of the sillcock 12 (i.e., unseating the valve mechanism 32) causes water to flow through breaks in the tube 20. Water leaking from the ruptured sillcock 12 flows into the internal chamber 60 and through the outlet 76 of the leak guard 10, alerting the operator that the sillcock 12 is ruptured.

It will be observed that replacement of the ruptured sillcock may be performed entirely from the outside of the building. More particularly, force is applied on the spigot assembly 22 to rotate the ruptured sillcock in a direction that unscrews the male-threaded nipple 30 from the coupling 78. It will be appreciated that the leak guard 10 is prevented from similar unscrewing rotational movement by the fact that the guard 10 is secured to the building by screws 72, 74. A new sillcock is installed within the leak guard 10 by merely inserting the tube 20 within the chamber 60 and threading the male-threaded nipple 30 into coupling 78. The preferred threaded interengagement of the leak guard 10 and sillcock 12 not only provides a connection that facilitates replacement of the sillcock 12, but a connection that has proven to be very durable in plumbing fixtures and is much more reliable than conventional protective devices (e.g., O-rings, elastomeric washer or some type of seal ring). Again, the fact that the leak guard 10 is secured to the building by screws 72, 74 prevents the guard 10 from transmitting torque to the supply line 14 during sillcock installation.

It will be appreciated that buildings or homes may be retrofit with the leak guard 10. Such retrofit attachment simply requires the removal of the existing sillcock 12 (i.e., by unscrewing the sillcock from the shut-off valve 56), widening of the opening 43 in the outside wall 44 to accommodate the leak guard 10, and installation of the leak guard 10 (i.e., by screwing the nipple 80 into the shut-off valve 56). For reasons described above, the leak guard 10 is preferably secured to the building or home by screws 72, 74. If desired, the leak guard 10 and sillcock 12 may be preassembled and installed in the home or building as an assembly.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, it is not necessary for the invention to be used with a "freeze proof" sillcock (i.e., a sillcock with a valve mechanism adjacent the innermost end of the tube). Any sillcock having an elongated tube extending inwardly from a spigot assembly may be utilized with the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. For use with a sillcock that controls the flow of water from a supply line associated with a building, a leak guard that prevents damage to the building when the sillcock ruptures, said sillcock including a tube, a valve within the tube, and a control knob at one end of the tube operably coupled with the valve, said guard comprising:

a tubular connector connectable between said tube of the sillcock and the supply line for establishing fluid communication therebetween when the guard is installed; and a housing sealingly secured to said connector and having an internal chamber for receiving the tube of the sillcock when the sillcock is connected to the connector, said housing having an outlet disposed to be located outside the building when the guard is installed for directing leaking water from the sillcock to a point outside the building.

2. In a leak guard as claimed in claim 1, said connector and said housing being a unitary structure.

3. In a leak guard as claimed in claim 1, said connector having means for threadably connecting to the tube of the sillcock.

4. In a leak guard as claimed in claim 3, said connector having means for threadably connecting to said supply line of the building.

5. In leak guard as claimed in claim 1, said housing including a flange disposed adjacent said outlet, the flange having means for securing the leak guard to the building.

6. In a leak guard as claimed in claim 5, said flange being substantially elliptical and having a pair of screw holes for receiving screws to secure the guard to the building, each of the holes being located at the focal ends of said flange.

7. In a leak guard as claimed in claim 1, said connector being an elongated shank axially aligned with the housing, the shank including a coupling disposed within the housing and connectable with the tube of the sillcock and an outwardly projecting nipple connectable with the supply line.

8. In a leak guard as claimed in claim 7, said coupling including means for threadably connecting to the tube of the sillcock.

9. In a leak guard as claimed in claim 8, said nipple including means for threadably connecting to the supply line of the building.

10. A guarded sillcock assembly comprising:

a sillcock that controls the flow of water from a supply line associated with a building, said sillcock including a tube, a valve within the tube, and a control knob at one end of the tube operably coupled with the valve; and a leak guard for the sillcock that prevents damage to the building when the sillcock ruptures, said guard including a tubular connector interconnected to said tube of the sillcock and connectable with the supply line, said connector disposed between the tube and supply line for establishing fluid communication therebetween, and a housing sealingly secured to said connector and having an internal chamber receiving the tube of the sillcock, said housing having an outlet disposed to be located outside the building when the guard is installed for directing leaking water from the sillcock to a point outside the building.

11. In an assembly as claimed in claim 10, said connector and said housing being a unitary structure.

12. In an assembly as claimed in claim 10, said connector and said tube of the sillcock being threadably interconnected.

13. In an assembly as claimed in claim 12, said connector having means for threadably connecting to said supply line of the building.

14. In an assembly as claimed in claim 10, said housing including a flange disposed adjacent said outlet, the flange having means for securing the leak guard to the building.

15. In an assembly as claimed in claim 14, said flange being substantially elliptical and having a pair of screw holes for receiving screws to secure the guard to the building, each of the holes being located at the focal ends of said flange.

16. In an assembly as claimed in claim 10, said connector being an elongated shank axially aligned with the housing, the shank including a coupling disposed within the housing and interconnected with the tube of the sillcock and an outwardly projecting nipple connectable with the supply line.

17. In an assembly as claimed in claim 16, said coupling and said tube of the sillcock being threadably interconnected.

18. In an assembly as claimed in claim 17, said nipple including means for threadably connecting to the supply line of the building.

19. In combination with a water supply line of a building, a guarded sillcock assembly comprising:

a sillcock that controls the flow of water from a supply line associated with a building, said sillcock including a tube, a valve within the tube, and a control knob at one end of the tube operably coupled with the valve; and a leak guard for the sillcock that prevents damage to the building when the sillcock ruptures, said guard including a tubular connector interconnected with said tube of the sillcock and said supply line of the building, said connector being disposed between the tube and supply line for establishing fluid communication therebetween, and a housing sealingly secured to said connector and having an internal chamber receiving the tube of the sillcock, said housing having an outlet disposed to be located outside the building for directing leaking water from the sillcock to a point outside the building.

20. In a combination as claimed in claim 19, said connector and said housing being a unitary structure.

21. In a combination as claimed in claim 19, said connector and said tube of the sillcock being threadably interconnected.

22. In a combination as claimed in claim 21, said connector and said supply line of the building being threadably interconnected.

23. In a combination as claimed in claim 19, said housing including a flange disposed adjacent said outlet, the flange having means for securing the leak guard to the building.

24. In a combination as claimed in claim 23, said flange being substantially elliptical and having a pair of screw holes for receiving screws to secure the guard to the building, each of the holes being located at the focal ends of said flange.

25. In a combination as claimed in claim 19, said connector being an elongated shank axially aligned with the housing, the shank including a coupling disposed within the housing and interconnected with the tube of the sillcock and an outwardly projecting nipple interconnected with the supply line.

26. In a combination as claimed in claim 25, said coupling and said tube of the sillcock being threadably interconnected.

27. In a combination as claimed in claim 26, said nipple and said supply line of the building being threadably interconnected.

\* \* \* \* \*